(12) United States Patent
Laube et al.

(10) Patent No.: US 8,383,266 B2
(45) Date of Patent: Feb. 26, 2013

(54) ZIRCONIUM OXIDE AND METHOD FOR THE PRODUCTION THEREOF

(75) Inventors: Jörg Laube, Laufenburg (DE); Alfred Gügel, Bad Säckingen (DE); Ralph Otterstedt, Goslar (DE)

(73) Assignee: H.C. Starck GmbH (DE)

( * ) Notice: Subject to any disclaimer, the term of this patent is extended or adjusted under 35 U.S.C. 154(b) by 402 days.

(21) Appl. No.: 12/377,780

(22) PCT Filed: Jul. 24, 2007

(86) PCT No.: PCT/EP2007/057607
§ 371 (c)(1),
(2), (4) Date: Mar. 11, 2009

(87) PCT Pub. No.: WO2008/019926
PCT Pub. Date: Feb. 21, 2008

(65) Prior Publication Data
US 2010/0233579 A1    Sep. 16, 2010

(30) Foreign Application Priority Data

Aug. 17, 2006 (DE) .......................... 10 2006 038 602
Sep. 20, 2006 (DE) .......................... 10 2006 044 824

(51) Int. Cl.
*C01G 25/02* (2006.01)
(52) U.S. Cl. ..................... 429/218.1; 423/608
(58) Field of Classification Search .................. 423/608; 429/218.1
See application file for complete search history.

(56) References Cited

U.S. PATENT DOCUMENTS

| | | | |
|---|---|---|---|
| 3,525,597 A | 8/1970 | Mazdiyasni et al. | |
| 3,957,500 A | 5/1976 | Pitts | |
| 4,360,598 A | 11/1982 | Otagiri et al. | |
| 4,542,110 A | 9/1985 | Nakada et al. | |
| 4,810,680 A | 3/1989 | Bickford et al. | |
| 5,023,071 A | 6/1991 | Sherif | |
| 5,278,007 A * | 1/1994 | Nanataki et al. | 429/247 |
| 5,312,613 A * | 5/1994 | Shyu et al. | 423/608 |
| 5,750,459 A | 5/1998 | Marella et al. | |
| 6,303,091 B1 * | 10/2001 | Mohri et al. | 423/263 |
| 7,465,431 B2 | 12/2008 | Katusic et al. | |
| 7,608,357 B2 * | 10/2009 | Ukai et al. | 429/496 |

FOREIGN PATENT DOCUMENTS

| | | |
|---|---|---|
| DE | 96467 | 3/1973 |
| DE | 10138573 A1 | 3/2003 |
| EP | 1076036 A1 | 2/2001 |
| EP | 1829824 | 9/2007 |
| JP | 4-260615 | 9/1992 |
| WO | WO-03/051790 A1 | 6/2003 |

OTHER PUBLICATIONS

Elektrische Leitfahigkeit aus Wikipedia, der freien Enzyklopadie, pp. 1-4 Aug. 31, 2006.
Gravimetrische Methoden der Dichtebestimmung, pp. 13-16, pp. 137-138.
Roempp Lexikon Chemie, 10th Ed., 1999, p. 3073.
Wate to Zirconium and Zirconium Com-pounds aus Ullmann's Encyclopedia of Industrial Chemistry, vol. A28, 1996, pp. 556-557.
Zirconia aus Firmenschrift von Tosoh, 1997.

\* cited by examiner

*Primary Examiner* — Stuart Hendrickson
(74) *Attorney, Agent, or Firm* — Novak Druce Connolly Bove + Quigg LLP

(57) ABSTRACT

The invention relates to a pulverulent zirconium oxide containing metal oxides from the group consisting of scandium, yttrium, rare earths and mixtures thereof, processes for producing them and their use in fuel cells, in particular for the production of electrolyte substrates for ceramic fuel cells.

48 Claims, 2 Drawing Sheets

ZIRCONIUM OXIDE AND METHOD FOR THE PRODUCTION THEREOF

CROSS-REFERENCE TO RELATED APPLICATIONS

Related Applications

This application is a national stage application (under 35 U.S.C. §371) of PCT/EP2007/057607, filed Jul. 24, 2007, which claims benefit of German application 10 2006 038602.7, filed Aug. 17, 2006 and German application 10 2006 044 824.3, filed Sep. 20, 2006.

BACKGROUND OF THE INVENTION

The invention relates to a pulverulent zirconium oxide containing metal oxides from the group consisting of scandium, yttrium, rare earths and mixtures thereof, processes for producing them and their use in fuel cells, in particular for the production of electrolyte substrates for ceramic fuel cells.

Pure zirconium oxide ($ZrO_2$) exists in three modifications. The cubic high-temperature phase is converted at below 2300° C. into metastable tetragonal zirconium oxide, and the transformation from tetragonal into monoclinic $ZrO_2$ is observed between 1200° C. and 950° C. Transformations between the monoclinic phase and the high-temperature phases on heating and cooling are associated with step changes in volume.

Sintering of zirconium dioxide occurs in a temperature range which is significantly above the temperature of the reversible monoclinic-tetragonal phase transformation. To avoid conversion back into the monoclinic phase, the high-temperature modifications have to be stabilized by means of foreign oxides. The stabilized zirconium oxides are then present in the same stabilized modification from room temperature up to the melting point, i.e. the large volume changes on cooling in the manufacture of ceramic components are avoided, see Ullmann's Encyclopedia of Industrial Chemistry, Vol. A28, 1996, p. 556 ff., Römpp Lexikon Chemie, 10$^{th}$ edition 1999, p. 3073. Stabilized or partially stabilized zirconium oxide powders are therefore used for producing ceramic components. The stabilizer oxides have to be able to form a solid solution with zirconium oxide. This requirement is met when using alkaline earth metal oxides, scandium oxide, yttrium oxide and some oxides of the lanthanides and actinides. The amount of stabilizer required depends on the desired properties and the type of oxide.

Unsatisfactory homogeneity of the stabilizer in the $ZrO_2$ lattice leads to the presence of proportions of undesirable monoclinic, i.e. unstabilized, phases. Depending on the concentration, type and amount of stabilizer oxides and the sintering conditions employed, tailored zirconium oxide materials having improved properties can be produced and these are used, for example, in structural elements and components in modern mechanical engineering, in human medicine, in cutting tools and in thermal insulation layers.

In recent years, zirconium oxides doped with yttrium oxide have been increasingly used in the production of ceramic fuel cells. An important property of substrates produced from zirconium oxides for ceramic fuel cells is their electrical conductivity, which has a critical influence on the performance of the fuel cell.

According to WO 03/051790, stabilized zirconium oxides are usually produced by two main methods in different variants.

In wet-chemical methods, solids containing both zirconium and stabilizer metals are separated from aqueous or organic solutions or suspensions of zirconium precursors and stabilizer precursors. In general, the solids are separated off by means of coprecipitation and filtration of the hydroxides. However, other separation techniques such as sol-gel, evaporation, spray pyrolysis and hydrothermal processes are also employed. After separation of the precipitated precursors, these are then calcined at temperatures in the range from 500 to 1500° C.

U.S. Pat. No. 3,957,500 describes a coprecipitation process for producing a homogeneous mixture of zirconium hydroxide and yttrium hydroxide. After calcination at from 900 to 1500° C. for from 1 to 10 hours, the stabilized zirconium dioxide is formed.

A similar typical commercial process is described in U.S. Pat. No. 4,810,680, in which basic zirconium carbonate and yttrium carbonate are dissolved in hydrochloric acid. The hydroxides are subsequently coprecipitated by addition of ammonia or sodium hydroxide. The hydroxide mixture is washed, dried and calcined at from 680 to 980° C.

DE 10138573 discloses a nanosize pyrogenically produced tetragonal yttrium-stabilized zirconium oxide (YSZ) powder and the process for producing it. Here, aqueous and/or alcoholic solutions of Zr and Y precursors, e.g. nitrates and propionates, are atomized by means of a nozzle in a reaction tube in which a hydrogen/air flame is burning and subsequently burnt at temperatures of from 800 to 1000° C.

U.S. Pat. No. 5,750,459 describes the production of gels or spherical or microspherical particles by dropwise introduction of a Y/Zr nitrate solution into an ammonium hydroxide solution. After separation and rinsing of the gels or agglomerates produced with water and subsequent calcination at temperatures above 550° C., spherical and microspherical stabilized zirconium dioxide powders are obtained. The high filtration rate of gel precursors is a decisive disadvantage over the traditional hydroxide precipitation process.

A disadvantage of all wet-chemical processes described is the large amounts of wastewater obtained. In addition, it is always necessary to carry out elaborate washing steps in order to remove all by-products. If washing is incomplete, offgases such as $HCl/Cl_2$ or $NO_x$ are formed during calcination of the precursors.

The other method of producing stabilized $ZrO_2$ powders is the mixed oxides or solid-state process. In this process, mixtures of zirconium dioxide and stabilizers are homogenized and subsequently sintered to form stabilized $ZrO_2$ powder. The solid-state process is simple and inexpensive to carry out. In contrast to the wet-chemical processes, no by-products or polluted wastewater and offgases, apart from recyclable water or water vapor, are formed.

Disadvantages of the process are the high sintering temperatures of >1300° C. and the low homogeneity of the powders, which contain from 25 to 30% by volume of monoclinic phase after sintering. To minimize the proportions of monoclinic phase, the products are repeatedly milled and heat treated in a plurality of stages, resulting in a significant increase in the product costs. Stabilized $ZrO_2$ powders are therefore rarely produced by the mixed oxides process.

U.S. Pat. No. 4,542,110 discloses a process for producing a sintered body via wet milling of a mixture of zirconium dioxide and yttrium oxide with addition of $SiO_2$ and $Al_2O_3$ as sinter aids and subsequent drying and sintering of the mixture at temperatures of >1300° C., preferably in the range from 1400° C. and 1500° C., for from 10 to 120 minutes. After subsequent repeated mixing and heat treatment, the proportion of cubic phase is increased to at least 95% by volume.

U.S. Pat. No. 4,360,598 describes a process for producing a YSZ ceramic by mixing of amorphous zirconium dioxide with yttrium oxide or an yttrium-containing salt and subsequent sintering. After sintering at temperatures of from 1000 to 1550° C., ceramic bodies which comprise mainly tetragonal and cubic zirconium dioxide are obtained.

EP 1076036 describes the production of zirconium oxides stabilized with yttrium or other metals by melting of the precursors in high-frequency or medium-frequency furnaces at temperatures of from 2200 to 3000° C.

DD 96467 discloses a fully stabilized cubic zirconium dioxide which is produced by mixing of basic zirconium carbonate and stabilizing additives such as calcium oxide or yttrium oxide and subsequent sintering at 800° C/3 h.

WO 03/051790 describes a process for producing tetragonal zirconium dioxide or mixtures of tetragonal and cubic zirconium dioxide.

A disadvantage of the zirconium dioxide powders produced according to the prior art via the mixed oxides process is their unsatisfactory homogeneity of the stabilizers in the crystal lattice. For sufficient stabilization nevertheless to be ensured, high sintering temperatures are necessary. However, these lead to higher production costs, at least in part due to the additional process steps required (crushing, classification). Furthermore, the high sintering temperatures lead to undesirably low BFT values and to reduced sinter activity of the powders. These powders are unsuitable for use in ceramic fuel cells because of their low electrical conductivity and unsatisfactory sinter activity.

BRIEF SUMMARY OF THE INVENTION

It is therefore an object of the present invention to provide zirconium oxide powders for use in ceramic fuel cells, which have high electrical conductivities and high mechanical strengths after having been sintered to gastight bodies.

A further object of the present invention is to provide an economical process for producing the zirconium oxide powders.

The object is achieved by a pulverulent zirconium oxide containing up to 10 mol % of at least one metal oxide from the group consisting of scandium, yttrium, rare earths and mixtures thereof which has a fill density of from $\geq 1.2$ to 2.5 g/cm$^3$, measured in accordance with ASTM B 417.

The pulverulent zirconium oxides of the invention preferably have a fill density of from $\geq 1.2$ to 2.3 g/cm$^3$, particularly preferably from $\geq 1.6$ to 2.0 g/cm$^3$, particularly preferably from $\geq 1.3$ to 1.9 g/cm$^3$ and in particular from 1.5 to 1.7 g/cm$^3$. The zirconium oxides of the invention preferably have a fill density of from $\geq 1.5$ to 2.5 g/cm$^3$, particularly preferably from $\geq 1.6$ to 2.3 g/cm$^3$.

DETAILED DESCRIPTION OF THE INVENTION

Figure 1:
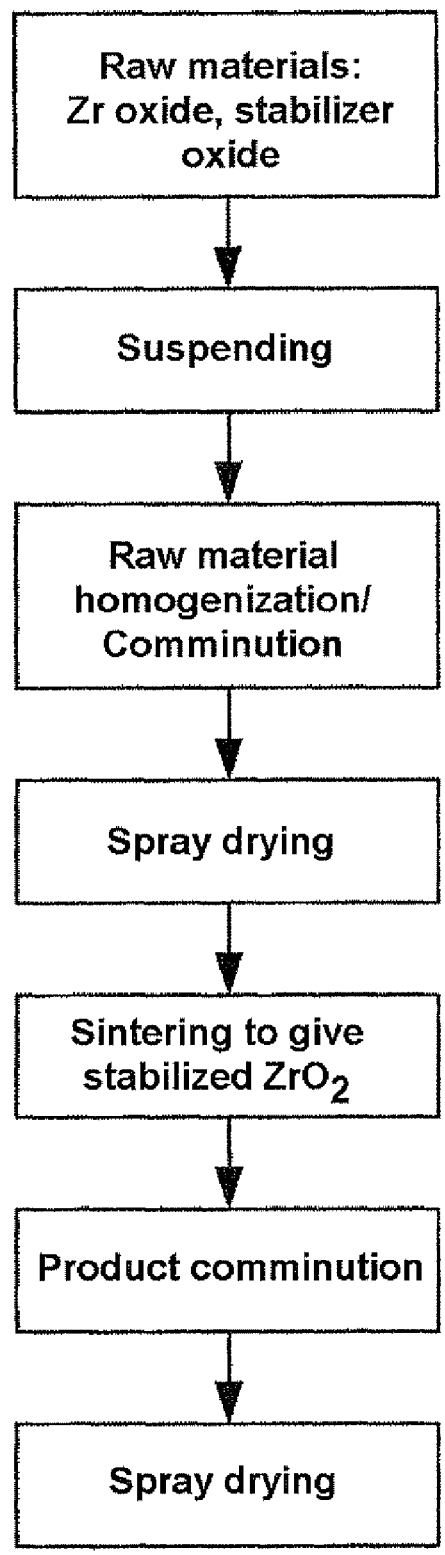
FIG. 1 schematically shows the process of the invention.

The zirconium oxides of the invention are particularly useful as precursors for producing substrates which are used in ceramic fuel cells because of their high electrical conductivity. Good results are achieved when the zirconium oxides contain from 3 to 10 mol % of yttrium oxide as stabilizer. The zirconium oxides of the invention preferably contain from 3 to 6 mol %, particularly preferably from 3 to 5 mol % and in particular from 3 to 4 mol %, of yttrium oxide.

The zirconium oxides of the invention can also preferably contain from 3 to 10 mol %, more preferably from 3 to 7 mol %, particularly preferably from 4 to 6 mol %, of ytterbium oxide ($Yb_2O_3$) as stabilizer.

The zirconium oxides of the invention preferably have a D90 of the powder particles of from 0.5 to 1.2 μm, preferably from 0.5 to 0.9 μm, particularly preferably from 0.6 to 0.9 μm, measured in accordance with ASTM C 1070.

The powders of the invention are also distinguished by their specific surface area (BET). The powders preferably have BET values, measured in accordance with ASTM D 3663, of from 5 to 18 m$^2$/g, preferably from 5 to 15 m$^2$/g, preferably from 10 to 16 m$^2$/g, preferably from 7 to 13 m$^2$/g, particularly preferably from 9 to 12 m$^2$/g. The zirconium dioxides of the invention have very high proportions of monoclinic phase. Surprisingly and contrary to the prior art, according to which fully or partially stabilized powders having only very low proportions of monoclinic phase, up to a maximum of 10% by volume, are suitable for producing ceramic components because of the volume change associated with the reversible phase transformation from monoclinic to tetragonal, the zirconium oxide powders of the invention are suitable for producing ceramic substrates and in particular for applications in electrolyte-supported ceramic fuel cells despite proportions of monoclinic phase of up to 80% by volume. The zirconium oxide powders of the invention can have a proportion of monoclinic phase of from 5 to 80% by volume. The powders preferably have from 20 to 80% by volume, preferably from 20 to 60% by volume, particularly preferably from 40 to 75% by volume, in particular from to 70% by volume, of monoclinic phase. The particular powders according to the invention have from 40 to 55% by volume, preferably from 45 to 55% by volume, of monoclinic phase.

The invention further provides an efficient and economical process for producing the zirconium oxides of the invention.

The invention therefore also provides a process for producing zirconium oxides doped with metal oxides from the group consisting of scandium, yttrium and rare earths and mixtures thereof, which comprises the following steps:

a) provision of an aqueous suspension of zirconium oxide and the respective metal oxide in the desired stoichiometric ratio, including stabilization of the suspension by means of dispersants;

b) homogenization of the suspension by comminution using milling auxiliaries by introduction of a specific net milling energy of >0.1 kWh per kg of solid used, c) drying of the suspension at a temperature of >80° C. to give a homogeneous oxide mixture, d) sintering of the oxide mixture for phase formation at a temperature of at least 1200° C., e) production of a suspension and comminution of the sintered product formed in step d) using milling auxiliaries by introduction of a specific energy of >0.1 kWh per kg of sintered product, f) drying of the suspension.

FIG. 1 schematically shows the process of the invention.

In the process of the invention, an aqueous suspension having a solids content of at least 50% by weight of mixed oxide is produced from a zirconium oxide having a purity of at least 95%, preferably >99%, and at least one oxide from the group consisting of scandium, yttrium, rare earths and mixtures thereof in the desired stoichiometric ratio. The zirconium oxides used as raw material can contain up to 3% by mass of naturally occurring $HfO_2$.

To prevent agglomeration of the oxide particles and to produce a suspension which has a low viscosity and can be conveyed readily, dispersants based on polyacrylate, polyelectrolyte or polyacrylic acid are added to this suspension. Good results are achieved, for example, when using, based on the solids in the suspensions, from 1 to 12% by mass, preferably from 3 to 8% by mass, of the dispersants Dolapix CE 64 and/or Dolapix CA from Zschimmer & Schwarz.

The morphological properties of the zirconium oxide precursor play an important role in the process of the invention. It has been found that zirconium oxide precursors having edge lengths (a, b, c) of the crystallites of a=20-75 nm, b=20-90 nm and c=20-75 nm, preferably a=30-75 nm, b=30-75 nm and c=30 to 75 nm, particularly preferably a=35-50 nm, b=45-60 nm and c=35-45 nm, lead to the powders of the invention.

It has also been found that zirconium oxide precursors having a specific surface area (BET) of from 3 to 30 m$^2$/g, preferably from 6 to 15 m$^2$/g, particularly preferably from 6 to 11 m$^2$/g, measured in accordance with ASTM D 3663, lead to the zirconium oxides of the invention.

A critical factor in the production of the zirconium oxides of the invention is intensive homogenization of the suspension by wet milling. To carry out the milling processes, it is possible to use various apparatuses. Suitable apparatuses for this purpose are various types of ball mills. The comminution is preferably carried out in stirred ball mills. It has been found that the wet milling of the oxide mixture in a stirred ball mill with introduction of a specific effective net milling energy, later also referred to as energy input or milling energy input (MEI), of from 0.1 to 2.0 kWh per kg of solid used leads to the powders according to the invention having particular properties.

The net milling energy input ($E_{NET}$) is determined as the difference between the gross milling energy input ($E_{GROSS}$) and the energy input when the mill is running empty ($E_{EMPTY}$). $E_{GROSS}$ is recorded by means of a power/energy meter (D 122 from Gönnheimer) mounted on the mill. $E_{EMPTY}$ is obtained as the product of the empty power ($P_{EMPTY}$) of the mill and the milling time (t). The term empty power refers to the power which is drawn by the mill at the prescribed rotational speed without a charge of milling media and suspension. The power drawn by the mill can be read off directly from the power/energy meter.

$$E_{NET}=E_{GROSS}-E_{EMPTY} \text{ (in kWh), where}$$

$$E_{EMPTY}=P_{EMPTY}*t.$$

The specific effective milling energy input (MEI) is the quotient of $E_{NET}$ and the mass of oxides introduced (M).

$$MEI=E_{NET}/M_{OXIDES} \text{ (in kWh/kg)}$$

The specific effective milling energy input is preferably from 0.2 to 1.5 kWh/kg, preferably from 0.1 to 1.0 kWh/kg, preferably from 0.2 to 1.0 kWh/kg, preferably from 0.3 to 1.0 kWh/kg, particularly preferably from 0.2 to 0.7 kWh/kg, particularly preferably from 0.6 to 0.8 kWh/kg, of solid used and very particularly preferably from 0.2 to 0.5 kWh/kg of solid used.

After homogenization and subsequent drying at temperatures of $\geq 80°$ C., the oxide mixture is sintered at temperatures of at least 1200° C. The sintering is preferably carried out at temperatures of 1200-1350° C., particularly preferably at 1250-1300° C.

The sintered powders are subsequently subjected to intensive wet milling in order to obtain powders which can be dispersed to the primary particle range and can readily be processed further. The solids concentration in the suspension can be up to 80% by mass, preferably up to 70% by mass. The solids concentration in the suspension is preferably from 40 to 70% by mass, more preferably from 60 to 70% by mass, particularly preferably from 50 to 60% by mass.

Wet milling is preferably carried out at a specific effective milling energy input of from 0.4 to 2.5 kWh/kg, particularly preferably from 0.7 to 1.9 kWh/kg, particularly preferably from 0.4 to 1.0 kWh/kg, very particularly preferably from 0.4 to 0.8 kWh/kg and very particularly preferably from 0.4 to 0.6 kWh/kg, of solid.

After milling, the suspension is dried at temperatures of $\geq 80°$ C.

Drying is preferably carried out in a spray dryer at temperatures of $\geq 80°$ C., preferably $\geq 100°$ C., particularly preferably $\geq 110°$ C.

The novel zirconium oxide powders produced by the process of the invention are particularly suitable for producing substrates and in particular for producing electrolyte substrates for ceramic fuel cells.

The zirconium oxide powders of the invention can be pressed to give particularly dense pressed bodies.

The invention also provides pressed bodies comprising the zirconium oxides of the invention. The pressed bodies of the invention have a green density which is from 54 to 65%, preferably from 56 to 62%, particularly preferably from 56 to 58%, of the theoretical density.

The green density of the pressed bodies can be determined by the geometric method. Here, test specimens having an area of 1 cm$^2$ and a height of 5-10 mm are uniaxially pressed at a pressure of 100 MPa.

The test specimens are then isostatically pressed at 2000 MPa to densify them further and the volume (V) is subsequently calculated according to the formula $$V=a \times b \times c,$$

where a,b,c=edge lengths of the test specimens. The green density is determined by dividing the mass of the test specimens by the volume of the specimens. The pulverulent zirconium oxides of the invention also display a high sinter activity. The pressed bodies produced from the zirconium oxide powders of the invention form gastight sintered bodies having a high strength after sintering.

The density of a sintered pressed body can be determined by the buoyancy method. For this purpose, the mass of the test specimen is measured in air and in water at 21° C. and the density is determined according to the formula $$\text{Density of the specimen} = \frac{\text{Mass of the specimen in air} \times \text{density (water at 21° C.)}}{\text{Mass of the specimen in air} - \text{mass of the specimen in water}}.$$

The invention also provides sintered substrates comprising zirconium oxides according to the invention for electrolyte-supported ceramic fuel cells.

The sintered substrates of the invention have a high specific electrical conductivity, later also referred to as SEC. The magnitude of the specific electrical conductivity depends on the type and concentration of the metal oxide component used for doping and on the temperature. Thus, substrates composed of the zirconium oxides of the invention containing 3.5 mol % of $Y_2O_3$ display an SEC of at least 2.5 S/m, preferably at least 2.7 S/m, particularly preferably at least 2.9 S/m, measured at 850° C. The substrates composed of zirconium oxides according to the invention containing 4 mol % of $Yb_2O_3$ have an SEC of at least 3.8 S/m, preferably at least 4.2 S/m.

The substrates containing 6 mol % of $Yb_2O_3$ display an SEC of at least 6.6 S/m, preferably 6.8 S/m.

The specific electrical conductivity can be determined by means of a 4-point DC measurement.

Ceramic test specimens having a length of about 50 mm, a width of 10 mm and a thickness of about 100 μm are produced from the powders by tape casting. The tape casting slip is prepared by mixing 250 g of powder with 202 g of a commercially available binder (e.g. binder B73208 from Ferro) with addition of milling auxiliaries 418 g of 3YSZ milling cylinders (12 mm diameter) and 418 g of 3YSZ milling cylinders (10 mm diameter) from Tosoh in a 1 liter plastic bottle. The film casting slip is homogenized for 48 hours on a set of rollers. The milling cylinders are subsequently separated off and the slip is degassed for 24 hours by slow turning in a 0.5 liter PE bottle. The slip is poured through a filter onto a flat surface and brought to a height of about 250 μm by means of a doctor blade. After drying for 7-24 h, strips are cut from the sheet and are sintered at 1500° C. for 1 hour to give the abovementioned test specimens.

After height (H) and width (B) of the test specimen have been measured to a precision of +/−1 μm by means of a micrometer, four contact strips of frit-free platinum paste (from Matek, Jülich) are applied over the entire width of the test specimen by means of a template and baked at 1200° C. for 1 h. The spacing of the inner contact strips (L) is 25.5 mm. The outer contact strips are located at a distance of 7 mm from the inner contact strips. The baked platinum contacts of the specimen are pressed onto the fixed platinum contacts of the measurement holder by means of an aluminum oxide body having a mass of 20 g. A direct current (I) of 150 μA is applied to the outer contacts while the voltage (U) between the inner contacts is measured by means of a digital voltmeter.

To rule out the influence of polarization or contact effects at the inner electrodes, polarity and magnitude of the current are varied. The independence of the conductivity from polarization or contact effects at the inner electrodes is ensured by the change in the polarity and magnitude of the current not leading to any change in the conductivity.

The specific electrical conductivity (SEC) of the specimen is calculated according to the formula $$SEC, [S/m] = \frac{\frac{I[A]}{U[V]} \times L[m]}{H[m] \times B[m]}.$$

The substrates of the invention also have a high mechanical strength. Thus, the substrates of the invention containing 3.5 mol % of $Y_2O_3$ display a strength of from 2000 to 2500 MPa. The substrates containing 8.9 mol % of $Y_2O_3$ display a strength of from 900 to 1000 MPa. The substrates containing 4 mol % of $Yb_2O_3$ have a strength of from 2000 to 2100 MPa, and those containing 6 mol % of $Yb_2O_3$ have a strength of from 1050 to 1150 MPa.

The mechanical strength can be determined by the ring-and-ball method, based on DIN 52292.

Circular specimens having a diameter of about 34 mm were stamped from a dried green sheet and subsequently sintered at 1500° C. for one hour. After sintering, the circular specimens have a radius ($r_3$) of about 27 mm and a thickness (t) of about 100 μm. The force F to fracture of 20 of the sintered specimens is determined in succession in a ring-and-ball arrangement by means of an Instron testing machine. The ring has a diameter ($r_2$) of 5.6 mm. The transverse contraction coefficient v is assumed to be 0.30. The test speed is 0.5 mm/min. Fracture of the specimen is detected by means of an ultrasonic measuring head. The radius of the stressed area ($r_1$) is assumed as an approximation to be t/3. The radial tensile stress occurring at fracture is calculated according to the following formula:

$$\sigma = \frac{3F(1+v)}{4\pi t^2} \cdot \left\{ 2\ln\frac{r_2}{r_1} + \frac{(1-v)}{2(1+v)} \cdot \left[\left(\frac{r_2}{r_1}\right)^2 - 1\right]\left(\frac{r_1}{r_3}\right)^2 \right\}$$

The 20 measured values are evaluated by Weibull statistics. The strengths reported in the examples are derived from this standard statistical evaluation. The customary approximation of the diameter of the stressed area ($r_1$) can result in a systematic overestimation of the calculated fracture stresses. The specimen thickness is therefore reported in the following examples. At a constant specimen thickness, comparison of different test materials is possible.

The zirconium oxides of the invention are preferably used for producing electrolyte substrates and/or functional layers in fuel cells. The invention therefore provides a fuel cell containing a substrate composed of zirconium oxide according to the invention.

The invention also provides a fuel cell which has at least one functional layer which contains at least one of the zirconium oxide powders of the invention. In a preferred embodiment, the fuel cell of the invention is an anode-supported cell or an electrolyte-supported cell.

The invention is illustrated below with the aid of examples.

EXAMPLES

The following measurement methods were employed for analysis in the following examples:
 specific BET surface area—ASTM D 3663,
 particle size distribution—Microtrac X100, ASTM C 1070 with ultrasonic treatment for 10 min,
 ultrasonic pretreatment,
 crystallite size—XRD line profile analysis
 proportion of monoclinic phase—determined by the Dirats method/PWA-N 62
 fill density—ASTM B 417

Example 1

10.74 liters of deionized water were placed in a water-cooled double-walled reservoir and 23.5 kg of $ZrO_2$ having a specific surface area of 7.54 m²/g and crystallite edge lengths of a=47 nm, b=58 nm, c=43 nm and 1.56 kg of $Y_2O_3$ having a specific surface area of 5.36 m²/g were suspended by stirring with a high-speed stirrer, i.e. the solids content was 70% by mass. To stabilize the suspension, 0.37 kg of a 1:1 mixture of the two dispersant grades Dolapix CE 64 and Dolapix CA from Zschimmer & Schwarz were firstly added, resulting in an increase in the zeta potential. During milling, further amounts of the Dolapix CA/CE64 dispersant mixture were continuously added in order to continue to achieve sufficient stabilization of the surfaces and charges which had been newly created with progressing comminution, so that the suspension continued to have a low viscosity and could be readily stirred and conveyed during comminution despite a high solids concentration. The suspension was pumped by means of a diaphragm pump from the reservoir through a polypropylene-lined stirred ball mill model LMK 4 from Netzsch Feinmahltechnik and subsequently conveyed back into the reservoir, i.e. comminution was carried out in a circulation process. The milling chamber of the mill was filled with 10 kg of yttrium-stabilized zirconium dioxide (YSZ) milling balls having a diameter of 0.6 mm. The speed of rotation of the stirrer shaft was 1950 min$^{-1}$.

The net milling energy input ($E_{NET}$) was determined as the difference between the gross milling energy input ($E_{GROSS}$) and the energy input when the mill was running empty ($E_{EMPTY}$). $E_{GROSS}$ is recorded using a power/energy meter (D 122 from Gönnheimer) mounted on the mill. $E_{EMPTY}$ is calculated as the product of empty power ($P_{EMPTY}$) of the mill and the milling time (t).

$$E_{NET}=E_{GROSS}-E_{EMPTY} \text{ (in kWh), where}$$

$$E_{EMPTY}=P_{EMPTY}*t.$$

The specific effective milling energy input (MEI) is calculated as the quotient of $E_{NET}$ and the mass of oxides introduced (M).

$$MEI=E_{NET}/M_{OXIDES} \text{ (in kWh/kg).}$$

In the example, milling was carried out at a gross milling energy input of 30.6 kWh. The empty running power drawn at the indicated rotational speed of the stirrer shaft of 1950 min$^{-1}$ was 1.30 kW and the milling time was 9 hours. A net milling energy input of 0.754 kWh/kg therefore resulted.

After milling was complete, the suspension was spray dried. The inlet temperature of the spray dryer was 300° C. and the output temperature was 105° C. Spray-dried, discharge and cyclone materials were combined and screened through a 250 μm sieve. The spray-dried product had a specific surface area of 15.9 m$^2$/g.

The homogenized precursor mixture was subsequently sintered in a "NT 440" muffle furnace from Nabertherm at 1300° C. for a hold time of 2 hours while blowing in air; the heating and cooling rates were each 5 K/min. The sintered product was again comminuted in the stirred ball mill at a specific net milling energy input of 0.75 kWh/kg and subsequently spray dried. To break up coarse sintered agglomerates, milling was this time carried out in two stages using YSZ milling balls, with milling beads having a diameter of 2 mm being used in the first stage and milling beads of 0.6 mm being used in the second stage. The change of milling balls was carried out after a specific net milling energy input of 0.3 Wh/kg. In contrast to the precursor milling, a single addition of 1% of dispersant, based on the solid used, proved to be sufficient in the comminution of the sintered products.

The zirconium oxide powder obtained had a specific surface area of 10.63 m$^2$/g, a d$_{90}$ of 0.71 μm and a fill density of 1.81 g/cm$^3$. The Y$_2$O$_3$ content was 3.5% by volume. The proportion of monoclinic phase was 41% by volume.

The powder was pressed uniaxially at a pressure of 100 MPa to give pressed bodies. The pressed bodies were then isostatically pressed at 2000 MPa to densify them further.

The pressed bodies displayed a green density of 3.44 g/cm$^3$. The density of the pressed bodies after sintering at 1500° C/1 h was 6.01 g/cm$^3$ (98.2% of the theoretical density). The powder could be processed very readily by tape casting, drying and sintering at 1500° C. for one hour to produce electrolyte substrates. The substrates sintered at 850° C. displayed a specific electrical conductivity of 2.70 S/m. The mechanical strength of 90 μm thick substrates determined by the ring-and-ball method was 2413 MPa. The zirconium oxide in the sintered substrates was virtually fully stabilized; the content of monoclinic phase was <1% by volume.

Example 2

23.5 kg of ZrO$_2$ having a specific surface area of 9.71 m$^2$/g and crystallite edge lengths of a=36 nm, b=46 nm, c=36 nm and 1.56 kg of Y$_2$O$_3$ having a specific surface area of 5.36 m$^2$/g were suspended in 10.7 liters of water. The solids content of the suspension was 70% by mass. The homogenized precursor mixture after spray drying displayed a specific surface area of 19.28 m$^2$/g. The example was carried out by a method analogous to example 1.

The zirconium oxide powder obtained had a specific surface area of 9.43 m$^2$/g, a d$_{90}$ of 0.57 μm and a fill density of 1.84 g/cm$^3$. The Y$_2$O$_3$ content was 3.5 mol %. The proportion of monoclinic phase in the powder was 39% by volume. The powder was uniaxially pressed at a pressure of 100 MPa to give pressed bodies. The pressed bodies were then isostatically pressed at 2000 MPa to densify them further.

The pressed bodies displayed a green density of 3.49 g/cm$^3$. The density of the pressed bodies after sintering at 1500° C/1 h was 6.01 g/cm$^3$. The powder could be processed very readily by tape casting, drying and sintering at 1500° C. for one hour to produce electrolyte substrates. The sintered substrates displayed an electrical conductivity (SEC) at 850° C. of 2.72 S/m. The mechanical strength of 90 μm thick substrates was 1954 MPa. The zirconium oxide in the sintered substrates was fully stabilized, i.e. monoclinic ZrO$_2$ phase could no longer be detected by X-ray structure analysis.

Example 3

66 kg of ZrO$_2$ having a specific surface area of 6.63 m$^2$/g and crystallite edge lengths of a=50 nm, b=59 mm, c=44 nm and 4.4 kg of Y$_2$O$_3$ having a specific surface area of 3.74 m$^2$/g were suspended in 47 liters of water. The solids content was 60% by mass. The milling of the precursors was carried out at a specific net milling energy input of 0.50 kWh/kg of solid. The homogenized precursor mixture after spray drying displayed a specific surface area of 14 m$^2$/g. The further procedure in the example was analogous to example 1.

The product obtained had a specific surface area of 10.60 m$^2$/g, a d$_{90}$ of 0.64 μm and a fill density of 1.72 g/cm$^3$. The Y$_2$O$_3$ content was 3.5 mol %. The proportion of monoclinic phase in the powder was 50% by volume. The powder was uniaxially pressed at a pressure of 100 MPa to give pressed bodies. The test specimens were then isostatically pressed at 2000 MPa to densify them further.

The pressed bodies displayed a green density of 3.46 g/cm$^3$. The density after sintering at 1500° C/1 h was 6.01 g/cm$^3$. The powder could be processed very readily by tape casting, drying and sintering at 1500° C. for one hour to produce electrolyte substrates. The sintered substrates displayed a specific electrical conductivity (SEC) at 850° C. of 2.73 S/m. The mechanical strength of 90 μm thick substrates was 2390 MPa. The zirconium oxide in the sintered substrates was fully stabilized, i.e. monoclinic ZrO$_2$ phase could not be detected by X-ray structure analysis.

Example 4

93.7 kg of ZrO$_2$ having a specific surface area of 6.63 m$^2$/g and crystallite edge lengths of a=50 nm, b=59 nm, c=44 nm and 6.2 kg of Y$_2$O$_3$ having a specific surface area of 3.74 m$^2$/g were suspended in 66.6 liters of water. The solids content of the suspension was 60% by mass. The procedure was analogous to example 1. The resulting powder had a specific surface area of 11 m$^2$/g, a d$_{90}$ of 1.16 μm and a fill density of 1.67 g/cm$^3$. The Y$_2$O$_3$ content was 3.5 mol %. The proportion of monoclinic phase in the powder was 60% by volume. The powder was uniaxially pressed at a pressure of 100 MPa to give pressed bodies. The test specimens were subsequently isostatically pressed at 2000 MPa to densify them further.

The pressed bodies displayed a green density of 3.35 g/cm$^3$. The density after sintering at 1500° C./1 h was 6.09 g/cm$^3$. The powder could be processed very readily by tape casting, drying and sintering at 1500° C. for one hour to produce electrolyte substrates. The sintered substrates had an SEC, measured at 850° C., of 2.83 S/m. The mechanical strength of 90 µm thick substrates was 2191 MPa. The zirconium oxide in the sintered substrates was fully stabilized, i.e. monoclinic ZrO$_2$ phase could not be detected by X-ray structure analysis.

Example 5

46.5 kg of ZrO$_2$ having a specific surface area of 7.67 m$^2$/g and crystallite edge lengths of a=47 nm, b=56 nm, c=43 nm and 3.2 kg of Y$_2$O$_3$ having a specific surface area of 7 m$^2$/g were suspended in 33.2 liters of water. The solids content of the suspension was 60% by mass. The procedure was analogous to example 1.

The resulting powder had a specific surface area of 11.48 m$^2$/g, a d$_{90}$ of 0.7 µm and a fill density of 1.71 g/cm$^3$. The Y$_2$O$_3$ content was 3.5 mol %. The proportion of monoclinic phase in the powder was 45% by volume. The powder was uniaxially pressed at a pressure of 100 MPa to give pressed bodies. The test specimens were then isostatically pressed at 2000 MPa to densify them further.

The pressed bodies displayed a green density of 3.5 g/cm$^3$. The density after sintering at 1500° C./1 h was 6.02 g/cm$^3$. The powder could be processed very readily by tape casting, drying and sintering at 1500° C. for one hour to produce electrolyte substrates. The sintered substrates had an SEC, measured at 850° C., of 2.87 S/m. The mechanical strength of 90 µm thick substrates was 2285 MPa. The zirconium oxide in the sintered substrates was fully stabilized, i.e. monoclinic ZrO$_2$ phase could not be detected by X-ray structure analysis.

Example 6

Figure 2:
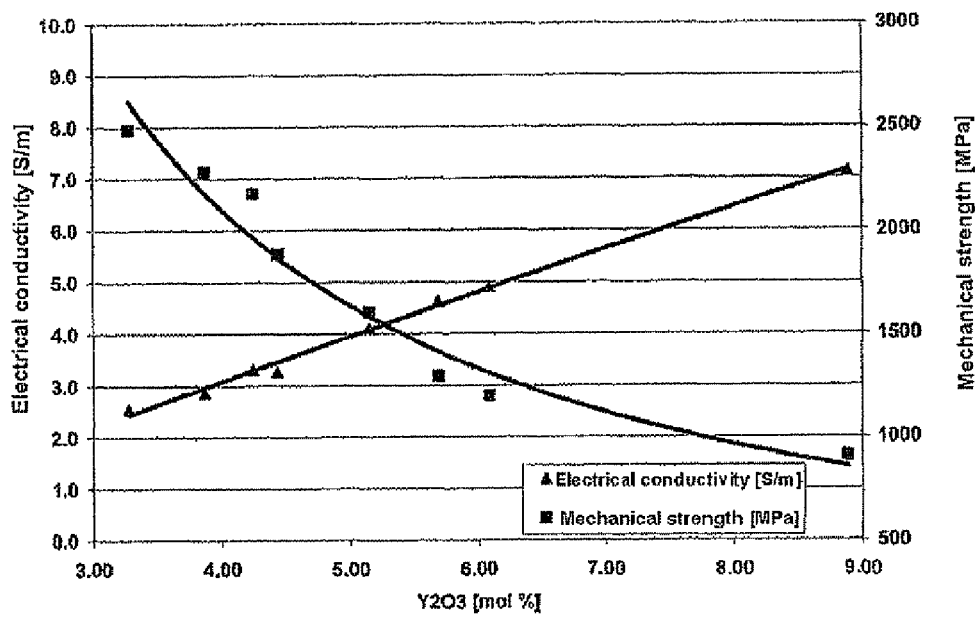
FIG. 2 illustrates the mechanical strength and specific electrical conductivity of substrates produced from zirconium oxides according to the invention in examples 1 to 6.

Doped ZrO$_2$ powders having different Y$_2$O$_3$ contents were produced by the process described in example 1. Zirconium oxide having a specific surface area of 7.67 m$^2$/g and crystallite edge lengths of a=47 nm, b=56 nm and c=43 nm and the Y$_2$O$_3$ having a specific surface area of 7 m$^2$/g which was also used in example 5 were used. The properties of the resulting powders, pressed bodies and substrates are shown in table 1. It can be seen from the table that the specific electrical conductivity increases with increasing yttrium oxide contents. In FIG. 2, the mechanical strength and specific electrical conductivity of substrates produced from zirconium oxides according to the invention in examples 1 to 6 are shown as a function of the Y$_2$O$_3$ content.

TABLE 1

| Powder | | | | | Pressed bodies | | Substrates | | |
|---|---|---|---|---|---|---|---|---|---|
| Y$_2$O$_3$ content [mol %] | Monoclinic phase [% by volume] | BET [m$^2$/g] | d$_{90}$ [µm] | Fill density [g/cm$^3$] | Green density [g/cm$^3$] | Sintered density (buoyancy method) [g/cm$^3$] | Monoclinic phase [% by volume] | Electrical conductivity [S/m] at 850° C. | Mechanical strength [MPa] (90 µm substrates) |
| 3.28 | 47 | 11.51 | 0.90 | 1.71 | 3.49 | 5.97 | <1 | 2.56 | 2487 |
| 3.87 | 45 | 11.48 | 0.70 | 1.71 | 3.50 | 6.02 | not detectable | 2.87 | 2285 |
| 4.25 | 34 | 11.02 | 0.75 | 1.85 | 3.48 | 5.98 | not detectable | 3.32 | 2178 |
| 4.44 | 34 | 10.72 | 0.92 | 1.81 | 3.52 | 5.98 | not detectable | 3.28 | 1887 |
| 5.15 | 26 | 10.86 | 0.88 | 1.82 | 3.53 | 5.96 | not detectable | 4.10 | 1603 |
| 5.69 | 19 | 10.40 | 0.71 | 1.85 | 3.54 | 5.96 | not detectable | 4.63 | 1295 |
| 6.09 | 16 | 10.40 | 0.73 | 1.76 | 3.57 | 5.96 | not detectable | 4.91 | 1200 |
| 8.89 | 8.9 | 10.09 | 0.75 | 1.64 | 3.53 | 5.89 | not detectable | 7.13 | 909 |

Example 7

Using a method analogous to the process described in example 1, a ZrO2 powder doped with 4 mol % of Yb$_2$O$_3$ was produced. 22.1 kg of the ZrO$_2$ which was also used in example 5 and 2.9 kg of Yb$_2$O$_3$ having a specific surface area of 3.77 m$^2$/g were used in 10.7 liters of water. The solids content of the suspension was 70% by mass.

The product obtained had a specific surface area of 10.89 m$^2$/g, a d$_{90}$ of 0.79 µm and a fill density of 1.73 g/cm$^3$. The proportion of monoclinic phase in the powder was 30% by volume. The powder was uniaxially pressed at a pressure of 100 MPa to give pressed bodies. The test specimens were then isostatically pressed at 2000 MPa to densify them further.

The pressed bodies displayed a green density of 3.66 g/cm$^3$. The density after sintering at 1500° C./1 h was 6.32 g/cm$^3$. The powder could be processed very readily by tape casting, drying and sintering at 1500° C. for one hour to produce electrolyte substrates.

Figure 3:
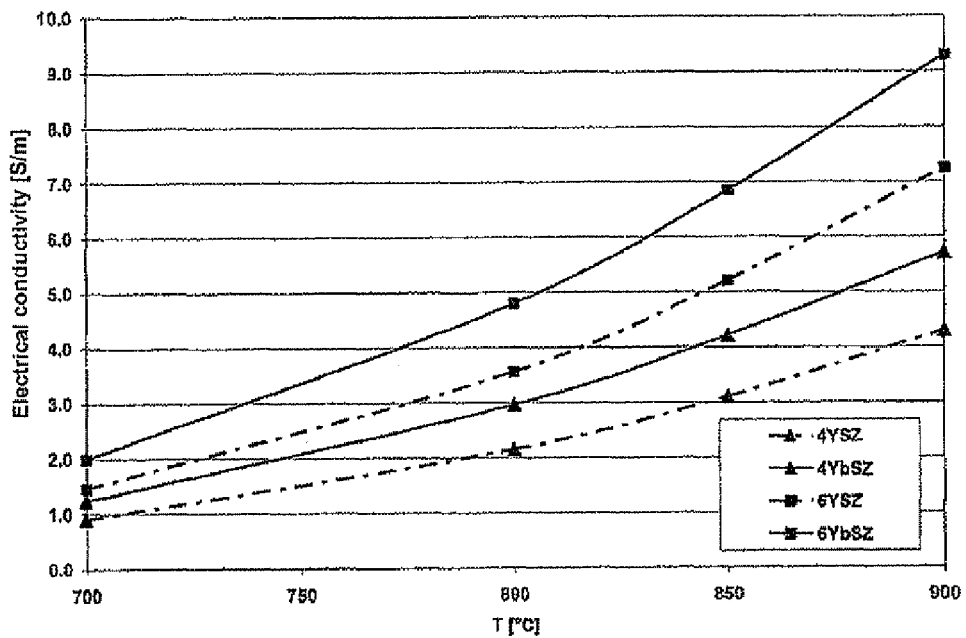
FIG. 3 illustrates the electrical conductivity versus temperature for sintered substrates.

As shown in FIG. 3, the sintered substrates composed of ZrO$_2$ doped with ytterbium oxide (YbSZ) displayed a specific electrical conductivity at 850° C. of 4.21 S/m, which was thus significantly higher than in the case of comparable substrates composed of ZrO$_2$ doped with 4 mol % of Y$_2$O$_3$ (YSZ), example 6. The mechanical strength of 95 µm thick substrates was 2066 MPa. The zirconium oxide in the sintered substrates was fully stabilized, i.e. monoclinic ZrO$_2$ phase could not be detected by X-ray structure analysis.

Example 8

Using a method analogous to example 7, a ZrO$_2$ powder doped with 6 mol % of Yb$_2$O$_3$ was produced from 20.8 kg of ZrO$_2$ and 4.2 kg of Yb$_2$O$_3$.

The product obtained had a specific surface area of 9.07 m²/g, a $d_{90}$ of 0.77 µm and a fill density of 1.84 g/cm³. The proportion of monoclinic phase in the powder was 13% by volume. The powder was uniaxially pressed at a pressure of 100 MPa to give pressed bodies. The test specimens were then isostatically pressed at 2000 MPa to densify them further.

The pressed bodies displayed a green density of 3.74 g/cm³. The density after sintering at 1500° C./1 h was 6.49 g/cm³. The powder could be processed very readily by tape casting, drying and sintering at 1500° C. for one hour to produce electrolyte substrates.

As shown in FIG. 3, the sintered substrates (6YbSZ) display a specific electrical conductivity at 850° C. of 6.85 S/m, which is thus significantly higher than in the case of comparable substrates composed of $ZrO_2$ doped with 6 mol % of $Y_2O_3$ from example 6. The mechanical strength of 95 µm thick substrates was 1108 MPa. The zirconium oxide in the sintered substrates was fully stabilized, i.e. monoclinic $ZrO_2$ phase could not be detected by X-ray structure analysis.

The invention claimed is:

1. A pulverulent zirconium oxide which comprises at least one metal oxide and said at least one metal oxide selected from the group consisting of scandium, rare earths and mixtures thereof, wherein the zirconium oxide contains not more than 10 mol % of the metal oxides and said zirconium oxide has a fill density of from 1.2 to 2.5 g/cm³, measured in accordance with ASTM B 417.

2. The pulverulent zirconium oxide as claimed in claim 1, wherein said fill density is from 1.3 to 1.9 g/cm³.

3. The pulverulent zirconium oxide as claimed in claim 1, wherein the zirconium oxide contains from 3 to 10 mol % of $Yb_2O_3$.

4. The pulverulent zirconium oxide as claimed in claim 1, wherein the zirconium oxide contains from 3 to 7 mol % of $Yb_2O_3$.

5. The pulverulent zirconium oxide as claimed in claim 1, wherein the zirconium oxide has a specific BET surface area of from 5 to 18 m²/g, measured in accordance with ASTM D 3663.

6. The pulverulent zirconium oxide as claimed in claim 1, wherein the zirconium oxide has a specific BET surface area of from 10 to 16 m²/g, measured in accordance with ASTM D 3663.

7. The pulverulent zirconium oxide as claimed in claim 1, wherein the zirconium oxide has a proportion of monoclinic phase of from 5 to 80% by volume.

8. The pulverulent zirconium oxide as claimed in claim 1, wherein the has a proportion of monoclinic phase of from 20 to 80% by volume.

9. The pulverulent zirconium oxide as claimed in claim 1, wherein the zirconium oxide has a proportion of monoclinic phase of from 45 to 70% by volume.

10. A fuel cell which has at least one functional layer containing the zirconium oxide as claimed in claim 1.

11. A pressed body comprising the pulverulent zirconium oxide as claimed in claim 1.

12. The pressed body as claimed in claim 11, wherein the body has a green density of from 54 to 65% of the theoretical sintered density.

13. The pressed body as claimed in claim 11, wherein the body has a green density of from 56 to 62% of the theoretical sintered density.

14. The pressed body as claimed in claim 13, wherein said green density is from 56 to 58% of the theoretical sintered density.

15. A substrate for electrolyte-supported ceramic fuel cells which comprises the pulverulent zirconium oxide as claimed in claim 1.

16. The substrate according to claim 15, which has a specific electrical conductivity (SEC) of at least 2.5 S/m, measured at 850° C.

17. The substrate as claimed in claim 15, which has a specific electrical conductivity (SEC) of at least 3.8 S/m, measured at 850° C.

18. The substrate as claimed in claim 15, which has a specific electrical conductivity (SEC) of at least 6.6 S/m, measured at 850° C.

19. A fuel cell which comprises the substrate as claimed in claim 15.

20. The fuel cell as claimed in claim 19 which is an anode-supported cell or an electrolyte-supported cell.

21. A pulverulent zirconium oxide which comprises yttrium oxide to be present in an amount not to exceed 10 mol % and said zirconium oxide has a fill density of from 1.2 to 2.5 g/cm³, measured in accordance with ASTM B 417 and a specific BET surface of from 5 to 18 m²/g and said zirconium oxide has a D90 of the powder particles of from 0.5 to 1.2 um measured in accordance with ASTM C 1070.

22. The pulverulent zirconium oxide as claimed in claim 21, wherein the zirconium oxide contains from 3 to 10 mol % $Y_2O_3$.

23. The pulverulent zirconium oxide as claimed in claim 21, wherein the zirconium oxide contains from 3 to 4 mol % $Y_2O_3$.

24. The pulverulent zirconium oxide as claimed in claim 21, wherein the zirconium oxide contains from 3 to 6 mol % $Y_2O_3$.

25. A pressed body comprising the pulverulent zirconium oxide as claimed in claim 21.

26. The pressed body as claimed in claim 25, wherein the body has a green density of from 54 to 65% of the theoretical sintered density.

27. The pressed body as claimed in claim 25, wherein the body has a green density of from 56 to 62% of the theoretical sintered density.

28. The pressed body as claimed in claim 27, wherein said green density is from 56 to 58% of the theoretical sintered density.

29. A substrate for electrolyte-supported ceramic fuel cells which comprises the pulverulent zirconium oxide as claimed in claim 21.

30. The substrate according to claim 29, which has a specific electrical conductivity (SEC) of at least 2.5 S/m, measured at 850° C.

31. The substrate as claimed in claim 29, which has a specific electrical conductivity (SEC) of at least 3.8 S/m, measured at 850° C.

32. The substrate as claimed in claim 29, which has a specific electrical conductivity (SEC) of at least 6.6 S/m, measured at 850° C.

33. A fuel cell which comprises the substrate as claimed in claim 29.

34. The fuel cell as claimed in claim 33, which is an anode-supported cell or an electrolyte-supported cell.

35. A fuel cell which has at least one functional layer containing the zirconium oxide as claimed in claim 21.

36. A process for producing zirconium oxides doped with metal oxides from the group consisting of scandium, yttrium and rare earths and mixtures thereof, which comprises the following steps:

a) provision of an aqueous suspension of zirconium oxide and the respective metal oxide in the stoichiometric ratio, including stabilizing the suspension by means of dispersants;
b) homogenization of the suspension by comminution using milling auxiliaries by introduction of a specific net milling energy of >0.1 kWh per kg of solid used,
c) drying of the suspension at a temperature of >80° C. to give a homogeneous oxide mixture,
d) sintering of the oxide mixture at a temperature of at least 1200° C.,
e) production of a suspension and comminution of the sintered product formed in step d) by introduction of a specific energy of >0.1 kWh per kg of sintered product,
f) drying of the suspension.

37. The process as claimed in claim 36, wherein the zirconium oxide raw material has edge lengths (a, b, c) of the crystallites wherein the values of a =20-75 nm, b =20-90 nm and c =20-75 nm.

38. The process as claimed in claim 37, wherein the values of a =30-50 nm, b =45-60 nm and c =35-45 nm.

39. The process as claimed in claim 36, wherein the zirconium oxide raw materials used have a specific BET surface area of from 3 to 30 m$^2$/g, measured in accordance with ASTM D 3663.

40. The process as claimed in claim 36, wherein the zirconium oxide raw materials used have a specific BET surface area of from 6 to 11 m$^2$/g, measured in accordance with ASTM D 3663.

41. The process as claimed in claim 36, wherein the homogenization of the raw materials is carried out by wet milling at a specific net milling energy input of from 0.2 to 1.5 kWh/kg of solid.

42. The process as claimed in claim 36, wherein the homogenization of the raw materials is carried out by wet milling at a specific net milling energy input of from 0.3 to 1.0 kWh/kg of solid.

43. The process as claimed in claim 36, wherein the homogenization of the raw materials is carried out by wet milling at a specific net milling energy input of from 0.6 to 0.8 kWh/kg of solid.

44. The process as claimed in claim 36, wherein the suspension is spray dried.

45. The process as claimed in claim 36, wherein the sintering is carried out at temperatures of from 1200 to 1350° C.

46. The process as claimed in claim 36, wherein the sintering is carried out at temperatures of from 1250 to 1300° C.

47. The process as claimed in claim 36, wherein the wet milling of the sintered oxide mixture is carried out at a specific net milling energy input of 0.5-2.5 kWh/kg of oxide mixture.

48. The process as claimed in claim 36, wherein the wet milling of the sintered oxide mixture is carried out at a specific net milling energy input of 0.7-1.9 kWh/kg of oxide mixture.

* * * * *

UNITED STATES PATENT AND TRADEMARK OFFICE
CERTIFICATE OF CORRECTION

PATENT NO.       : 8,383,266 B2                                                    Page 1 of 1
APPLICATION NO. : 12/377780
DATED            : February 26, 2013
INVENTOR(S)      : Laube et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
First Day of September, 2015

Michelle K. Lee
*Director of the United States Patent and Trademark Office*